United States Patent [19]

Dau et al.

[11] Patent Number: 4,724,080
[45] Date of Patent: Feb. 9, 1988

[54] CLARIFICATION OF WINE BY CROSSFLOW FILTRATION

[75] Inventors: Heribert Dau, Elsefeld; Rolf Maurer, Weinsberg; Franz-Josef Schmitz, Erlenbach, all of Fed. Rep. of Germany

[73] Assignee: AKZO NV, Arnhem, Netherlands

[21] Appl. No.: 6,258

[22] Filed: Jan. 14, 1987

Related U.S. Application Data

[63] Continuation of Ser. No. 749,437, Jun. 27, 1985, abandoned.

[30] Foreign Application Priority Data

Jun. 27, 1984 [DE] Fed. Rep. of Germany ....... 3423594

[51] Int. Cl.⁴ .............................................. B01D 13/00
[52] U.S. Cl. ...................................... 210/651; 210/181
[58] Field of Search ................. 426/592; 210/651, 181, 210/411, 416.1

[56] References Cited

U.S. PATENT DOCUMENTS

| | | | |
|---|---|---|---|
| 3,708,069 | 1/1973 | Clark | 210/181 |
| 3,856,569 | 12/1974 | Strong | 210/651 X |
| 3,988,486 | 10/1976 | Rhein | 210/651 X |
| 4,140,806 | 2/1979 | Glimenius et al. | 210/651 X |
| 4,498,982 | 2/1985 | Skinner | 210/416.1 X |
| 4,551,341 | 11/1985 | Blanie et al. | 210/651 X |

*Primary Examiner*—Frank Spear
*Attorney, Agent, or Firm*—Parkhurst & Oliff

[57] ABSTRACT

A process for the crossflow-microfiltration of wine from a storage container through a membrane filter with membranes having a nominal pore diameter of 0.1–5 m, in which the mean velocity in the membrane filter is 0.5–6 m/second, wherein before entering the membrane filter the wine is warmed to a temperature which is above a temperature threshold that produces a definite increase in filter performance but at the most to 45° C. Crossflow-microfiltration is carried out without addition of filtering aids and the filtrate obtained is cooled to storage temperature. An apparatus for carrying out the process comprises a storage container, a membrane filter with a nominal pore diameter of 0.1–5 m, a feed pump and piping, a heating device being attached upstream of the membrane filter and a cooling device and filtrate container being attached downstream therefrom.

12 Claims, 10 Drawing Figures

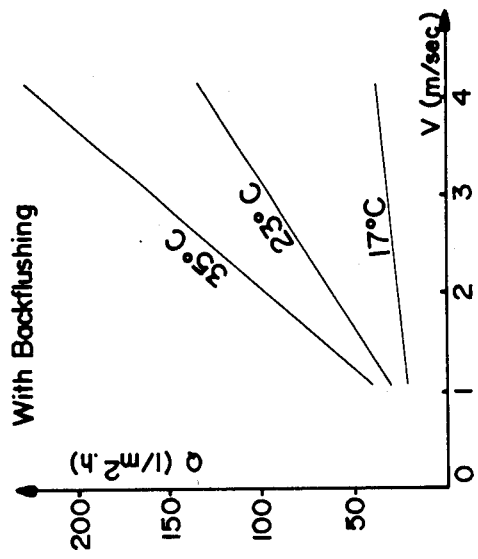
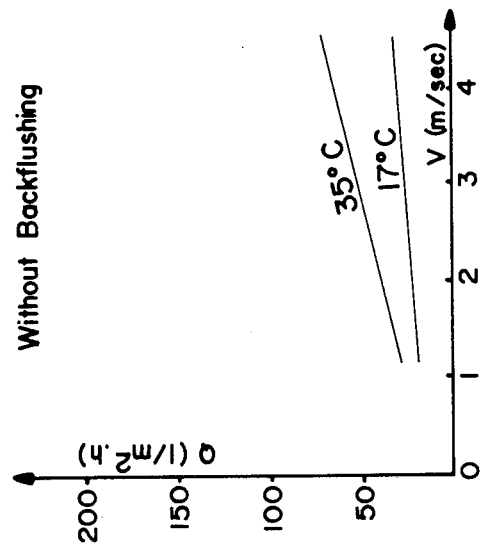

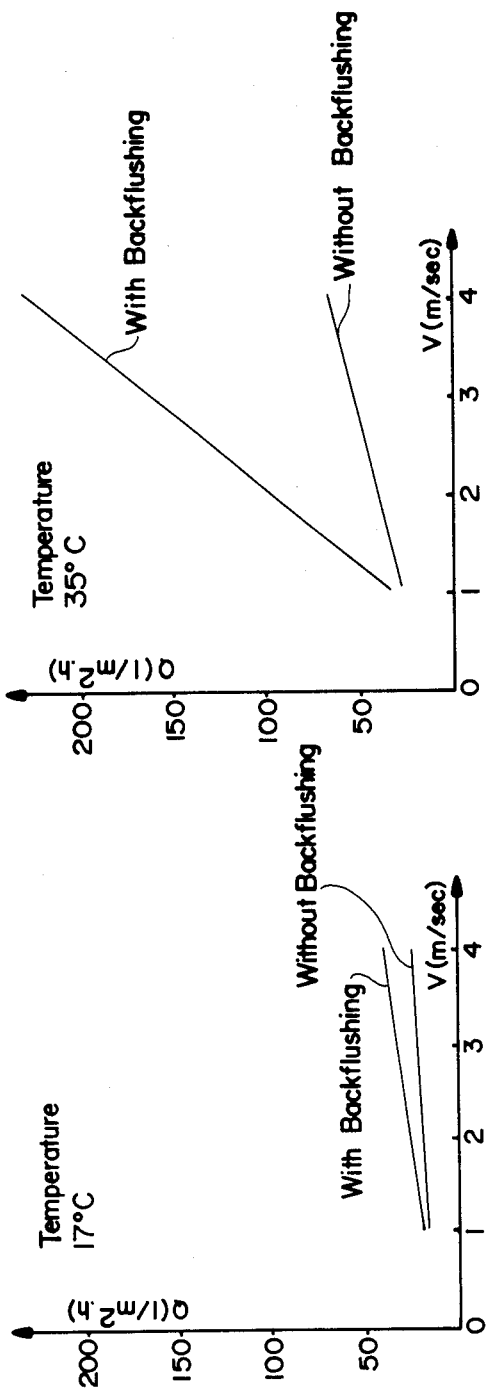

Enlargement 1:3400

Enlargement 1:100

CLARIFICATION OF WINE BY CROSSFLOW FILTRATION

This is a continuation of application Ser. No. 749,437 filed June 27, 1985, abandoned.

BACKGROUND OF THE INVENTION

The invention relates to a process for the crossflow-microfiltration of wine from a storage container through a membrane filter with membranes having a nominal pore diameter of 0.1–5/μm, in which the mean velocity in the membrane filter is 0.5–6 m/second, and an apparatus for implementation of the process.

All wines are cloudy at the beginning of their development. As they mature, they clear spontaneously, although clarification is slow and incomplete. Currently, clarification is predominantly mechanical.

Substances which cause cloudiness in young wine contain as their chief components yeast, protein compounds, pectins, glucans, tannins, polyphenols and sometimes dyes. The percentage composition fluctuates from one wine to the next, and it also fluctuates greatly from one vintage to the next. For his work, the winemaker has at his disposal a number of permitted refining agents as well as filtration techniques and apparatus that have been accepted for decades.

Despite numerous advances in this area, the current state of technology is still far from the solution of all problems.

The processes in general use at present are actually still emergency solutions, because the most efficient of all the conceivable procedures, viz. "sieving" (filtration) through a "sieve" (filter) with the right "mesh size" (separation threshold), cannot be utilized without special measures because of the extreme fineness of the particles causing turbidity.

The compromises that must be made for the conventional processes give rise to a number of individual problems, at least the following ones of which are serious and therefore in urgent need of solution:

Major expenditures of time, work and finances due to several process stages;

High energy requirement, noise, inadequate separation when using a separator (which can therefore be utilized as a preliminary step only);

Expenditure of time, product loss, expenditures for transportation, storage and compensation due to the use of diatomite filters, which is also increasingly becoming a problem of resources and costs;

Expenditure of time, product loss, expenditures for transportation, storage and compensation for the filters used in fine clarifiction and sterilization.

The crossflow-microfiltration process permits the use of the most efficient method, viz. separation by sieving of the fine particulate substances causing turbidity, which to date has appeared impossible.

The particles causing turbidity occur in various sizes, ranging from the coarse particles of several μm which settle rapidly, largely comprising yeasts of 4–20 μm, to particles of approximately 0.2–1.0 μm. Bacteria are included among the latter. The required threshold of separation is determined by the smallest particles that are to be separated.

As mentioned above, static filtration with the "appropriate sieve," i.e., a membrane filter, is not feasible in this range because filtration would very rapidly come to a standstill, especially in view of the relatively high concentrations of suspended particles. Due to the fineness of the particles and the pressure required for static filtration procedures, there would be rapid formation of a dense and firm filter cake which, even in a thin layer, would be absolutely impermeable to the material to be filtered.

However, if the formation of a filter cake can be prevented or at least greatly limited, e.g., by establishment of constant flow over the filter, then the desired filtration method can again be used. This is known from ultrafiltration in which separation thresholds are considerably lower than those in microfiltration.

By establishment of flow over the membrane filter, the liquid to be filtered is conveyed over the filter at high speed perpendicular to the direction of filtration.

Ideally, if filters are in the form of pipes or capillaries, the flow moves over them in an axial direction and therefore concomitantly avoids formation of a fairly thick filter cake over the entire internal surface of the membrane.

Suitable membrane filters in pipe and capillary form, which permit the desired dynamic microfiltration, have been available only for a short time. They make it possible to dispense with the emergency solution extended over various stages. The cloudy substance to be filtered can be conveyed to the membrane filter directly without preliminary separation by centrifugation. Since the pipe and capillary membranes are self-supporting, they exhibit adequate stability and high durability. Polypropylene membranes for the most part also display excellent chemical stability and therefore a lack of sensitivity to chemicals used for cleaning.

From U.S. Pat. No. 3,974,068 is known an ultrafiltration process for liquids containing microorganisms, macromolecules or other small solid particles as occur in a fermentation process, e.g., vinegar, wine or cider. In the known process, separation occurs at membranes having pore diameters of $10^{-2}$ to $10^{-4}$ mm and the liquid to be filtered is conveyed parallel to the filter surface. Velocity is allegedly limited in such a manner that a laminar flow is maintained. By way of example, a maximum velocity of 6.76 m/sec is indicated. A filtering aid is added to the liquid to be filtered. This consists preferably of mechanical wood pulp particles. For cooling, a cooler is attached to the membrane filter. The effectiveness of the filtration process is described using vinegar as an example and the filtration results achieved are relatively low.

In the performance of crossflow-microfiltration with wine, comparison of various vintages has shown considerable differences with regard to filtration results and frequency of cleaning the filters. Hence, only qualitative differences in wine vintages could be considered as the cause.

As a natural product, every wine has an individual composition which is also reflected in its filterability. Different filtration processes are therefore used. Red wines are known to be more difficult to filter than white wines. Such differences have been observed not only with wine obtained from grapes but also with fruit wines, although the latter do not otherwise differ from grape wines.

Colloidal components exert a substantial effect on filterability. As was reported in papers by K. Wucherpfennig et al (Deutsche Labensmittel-Rundschau 80(2):38–44, 1984 and Lebensmitteltechnik 5:246–253, 1983), the various colloids behave very differently, with the β-glucans in particular exerting a very negative effect on filterability.

The effects produced by various measures may be as different as the wines themselves and the components affecting filterability.

Since β-glucans are readily soluble in water, coating of the membrane filters with glucan can be controlled by simple rinsing with water. But this causes interruption of the filtration process.

In the case of wines that contain little if any β-glucan, there may be other reasons for poor filter performance.

SUMMARY OF THE INVENTION

It is therefore an object of the present invention to provide a crossflow microfiltration process for wine in which high filtration performance is achieved independent of qualitative differences in wines resulting from differing varieties and/or differing fermentation processes and/or wine vintages, and in which interruptions due to reduced performance in the filter modules are for the most part eliminated. Environmental pollution by filtering aids is also eliminated.

It was surprising to observe that, with the crossflow-microfiltration of wine, depending on the vintage and grape variety, there is a temperature threshold above which filtration velocity exhibits a definite increase. This effect has been graphically represented in FIG. 6 for a 1982 white wine for which the above-mentioned temperature threshold is 32° C.

This surprising finding results in the solution of the established problem, characterized by the fact that before entering the membrane filter the wine is warmed to a temperature which is above the temperature threshold that produces a definite increase in filter performance but at the most to 45° C., that crossflow-microfiltration is carried out without addition of filtering aids that the filtrate obtained is cooled to storage temperature.

Apparatus for implementation of the process according to the invention is also an object of the invention.

BRIEF DESCRIPTION OF THE DRAWINGS

FIGS. 2a, 2b, 3a, 3b and 4 graphically illustrate the experimental results contained in Example 1. FIG. 2a illustrates the filtration yield (Q) as dependent on flow velocity (V) at varying temperatures (T) without flushing; FIG. 2b illustrates the filtration yield (Q) as dependent on flow velocity (V) at varying temperatures (T) with backflushing; FIG. 3a illustrates the filtration yield (Q) as dependent on flow velocity (V) with and without backflushing at 17° C.; FIG. 3b illustrates the filtration yield (Q) as dependent on flow velocity (V) with and without backflushing at 35° C.; and FIG. 4 shows the filtration yield (Q) as dependent on the temperature (T) with backflushing at various flow velocities (V).

FIG. 5a shows a REM picture of the internal wall of a capillary membrane after wine filtration has taken place; enlargement 1:3400.

DETAILED DESCRIPTION OF THE INVENTION

Figure 1:
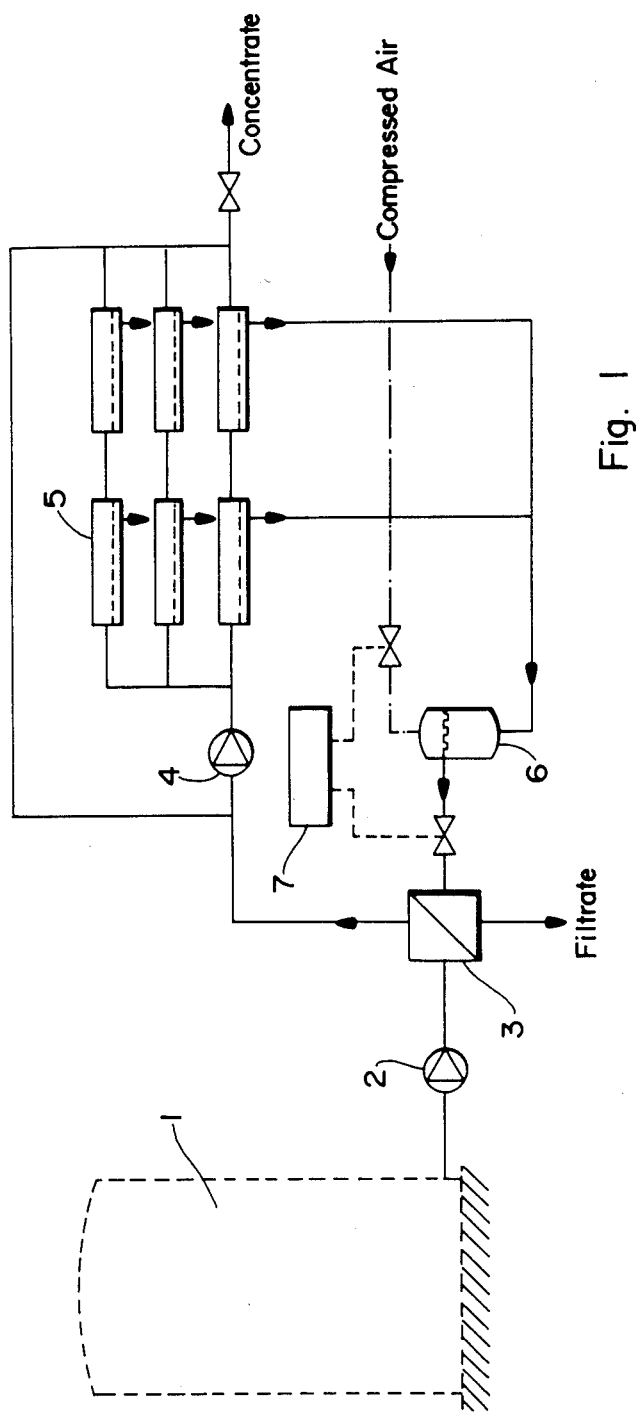
FIG. 1 shows a process diagram for a preferred form of construction for the process.

The temperature threshold can easily be determined by trial filtration with the wine to be filtered. This is accomplished by performing crossflow-microfiltration with a wine having a storage temperature of e.g. 16° C. until such time as there is a marked decrease in filtration performance. Thereafter, the filtration temperature is gradually elevated until there is a definite increase in filtration velocity. This temperature then constitutes the level of the temperature threshold for the wine tested as described above.

The storage temperature for wines is generally below 15°–17° C., preferably around 12° C.

To the extent that there is mention of nominal pore diameter within the scope of the present invention, nominal pore diameter will be defined as that diameter at which particles are retained absolutely. The nominal pore diameters of 0.2 and 0.4 m have been defined by ASTM Specification D 3862 and D 3863. Other nominal pore diameters are obtained analogously with test substances having different particle sizes.

The wine is warmed preferably to a temperature of 30°–40° C.

In order to remove the inevitable membrane coating which does affect performance, it is advantageous in accordance with the invention to rinse the membrane filter by backflushing of the filtrate. The interval between backflushing can be approximately two to ten minutes and the duration of rinsing can be approximately two to ten seconds.

In particular, the joint action of the cross flow velocity, temperature and backflushing parameters produces excellent filtration results.

On the other hand, the effect of turbidity is surprisingly slight. The filtrate yields obtained were scarcely higher when the young wine was preclarified with a separator or diatomite filter prior to crossflow-microfiltration.

In a preferred embodiment of the process according to the invention, the wine is conveyed to an internal circuit from which the filtrate is removed, and a partial stream of the concentrate in which substances causing turbidity have accumulated is conveyed to an external circuit.

In an expedient embodiment of the process according to the invention, the solids of the concentrates are separted in a mechanical separator in the external circuit and the liquid component of the concentrate is returned to the internal circuit. Centrifuges, rotary cell filters or other conventional filters can be used expediently as mechanical separation devices in the external circuit.

In another expedient embodiment of the process according to the invention, the concentrate is cooled in the external circuit in a heat exchanger with the wine from the storage container which is to be warmed for filtration, and returned to the storage container.

The temperatures in the circuits are preferably different. It is particularly advantageous for the wine to be warmed to a temperature above the temperature threshold immediately before entering the internal circuit and for the product streams issuing from the internal circuit to be cooled immediately. This limits the wine's exposure to heat in terms of time and quantity because the higher temperature occurs in the internal circuit only. It is advantageous to have the heat requirement met as much as possible by heat exchange between the product streams.

This preferred form of construction of the process is illustrated by way of example in a process diagram in FIG. 1.

The parameters affecting filtration performance were determined in numerous experimental series involving different wines. The relationships determined are complex and their effects can be detected only if several parameters are activated concomitantly.

Under consideration of these relationships, the cross flow velocity, temperature and recirculation parameters have been recognized as relevant.

In addition, the composition of the wine may exert a varying effect, with colloids in particular displaying widely variable behavior. Finally, the membrane properties are also significant.

Turbidity affects crossflow-microfiltration used according to the invention only slightly because the shearing forces developing in the course of membrane crossflow, which provide for continuous removal of the coating layer, exert differing effects on the particle spectrum of wine cloudiness. In this connection, kinetic energy can be transmitted more easily to larger particles (yeast cells) than to bacteria or colloids, which for the most part form the coating layer that decreases performance.

The coating layer which governs the yield builds up during the initial phase of filtration. Depending on the conditions and wine components, this phase lasts from several minutes to a number of hours. After the formation of the coating layer, the filtration yield fluctuates until it reaches a constant level which is maintained for a protracted period—observed to be up to a full week—provided that the external conditions also remain constant.

In the crossflow-microfiltration of 1982 wines, the coating layer appears to be composed primarily of water-soluble colloids, since simple rinsing with water spontaneously brings about the return of the initial value when wine filtration is continued. Because of the ensuing adulteration of the wine, however, rinsing with water cannot be used as a solution to the problem.

As a result of crossflow-microfiltration according to the invention, the young wine is not only clarified in one operation but also simultaneously has all microorganisms removed. Hence, very early in the processing stage, it is already the equivalent of a wine that has undergone sterilizing filtration (S-filtration). The EBC cloudiness values are also comparable with those of wines that have undergone sterilizing filtration. This qualitatively benefits the maturing of the wine since uncontrolled secondary reactions cannot occur.

Apparatus for implementation of the inventive process comprises of a storage container, a membrane filter with a nominal pore diameter of 0.1–0.5 μm, a feed pump and piping, a heating device being attached upstream of the membrane filter and a cooling device and filtrate container being attached downstream of the membrane.

The membrane according to the invention is preferably characterized by the fact that the heating device and cooling device each have three pipe systems and that the free space of the heating device and cooling device is filled with a heat-transferring medium, whereby the first pipe system of the heating device is provided wtih a heating medium, the second pipe system of the heating device is coupled with the inlet of the membrane filter and the second pipe system of the cooling device, and third pipe system of the heating device is coupled with the filtrate inlet of the membrane filter and the third pipe system of the cooling device, the first pipe system of the cooling device is provided with a coolant, and the second pipe system of the cooling device is coupled with the storage container and the third pipe system is coupled with the filtrate container.

In a preferred embodiment of the invention, the heating device and cooling device are combined in one joint construction unit.

A construction unit of this type is e.g., a heat exchanger in which heat exchange occurs between the wine and filtrate and the addition of residual heat and residual cooling required for establishment of the prescribed temperature takes place in the discharge cycle of the wine or filtrate.

The membrane filter is preferably composed of several membrane filter modules coupled to each other whereby, in this embodiment of the invention, some of the filter modules are coupled consecutively and some are coupled in parallel.

Crossflow-microfiltration according to the invention does not affect the composition of the separated wine components and therefore does not cause any quality modifications. The process according to the invention therefore offers clearcut advantages vis-a-vis the state of the art in technology.

The inventive crossflow-microfiltration process is characterized by clean and smooth operation. Because of the rapid clarification in a single process step, it brings about early maturing of young wines without undesirable secondary reactions since all microorganisms have been removed. The process is not very labor intensive; it can be automated to a great extent and adapted to individual and highly varying requirements. It is therefore economical.

The young wire to be filtered is conveyed from the presentation tank (1) by means of a feed pump (2), via the heat exchanger (3), to the internal circuit which contains a circulating pump (4) and a number of filter modules (5), some of which are connected in series and some in parallel. The filtrate is removed by way of the backflushing container (6) and the heat exchanger (3). The concentrate containing an accumulation of the substances causing turbidity is removed from the internal circuit; it is recirculated through a heat exchanger, which has not been represented, into the presentation tank, thus forming the external circuit. By regulation with a time-signal transmitter (7), at intervals of several minutes, the valves are so adjusted, for e.g. approximately one to three seconds, that the filtrate is made to flow back into the modules (5) from the backflushing container (6) by means of compressed air.

Figure 1A:
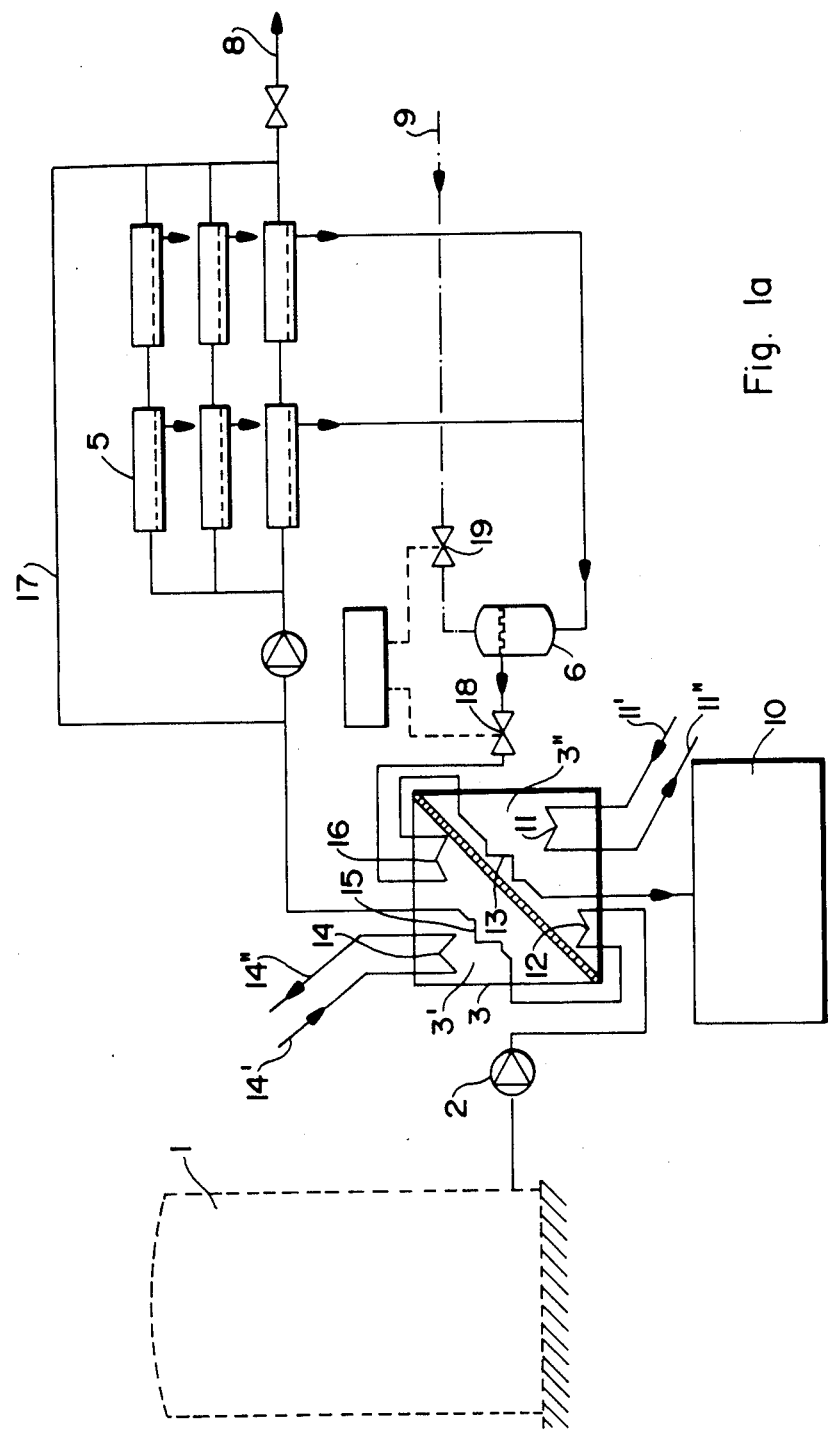
FIG. 1a shows another process diagram for another preferred form of construction for the process.

Another preferred form of construction of the inventive process is illustrated by way of example in the process diagram of FIG. 1a. Many of the elements of FIG. 1a are the same as those illustrated in FIG. 1, and heat exchanger (3) is shown in greater detail. As in the FIG. 1 process, young wine to be filtered is conveyed from presentation tank (1) by feed pump (2) through heat exchanger (3) to the internal circuit containing circulating pump (4) and membrane filter modules (5).

The filtrate is removed through backflushing container (6), passing through heat exchanger (3), ultimately collecting in filtrate container (10). The concentrate is removed from internal circuit (17) through a valve at exit (8), whereupon it is recirculated through a heat exchanger (not shown) and returned to the presentation tank (1) through an external circuit (not shown). Time-signal transmitter (7) regulates filtrate valve (18) and compressed air valve (19), which controls compressed air (9) from an external source (not shown), so that filtrate is forced by compressed air back into modules (5) from backflushing container (6).

Heat exchanger (3) comprises cooling portion (3") wherein cooling medium enters at inlet (11') and exits at exit (11") of first cooling pipe (11). Second heating pipe (12) circulates the incoming young wine through cooling portion (3"). Heat exchanger (3) also comprises heating portion (3') into which heating medium enters at inlet (14') and exits at exit (14") of first heating pipe (14). Cooled young wine passes from second cooling pipe (12) into second heating pipe (15) and then on into the internal circuit. Filtrate exiting backflushing container (6) through valve (18) passes through third heating pipe (16) and then through third cooling pipe (13) before collecting in filtrate container (10).

The process will be explained in greater detail on the basis of the following examples and figures, which are provided for illustration purposes only and are not intended to limit the scope of the invention defined by the appended claims.

EXAMPLE 1

In accordance with the process diagram presented in FIG. 1, young wines from 1983 were subjected to crossflow-microfiltration at temperatures of 17° C. and 35° C., and flow velocities between 1 m/sec and 4 m/sec. The cloudy wine to be filtered was conveyed in a circuit whereby the clear and sterile filtrate was continuously discharged and the solids were concentrated. The concentrate with a high content of solids was finally separated by itself into solids and residual liquid, e.g., by way of a small rotary drum filter. The residual liquid was returned to circulation. The membrane filter was made up of three parallel flow routes each of which had two consecutively coupled filter modules. Each module contained polypropylene capillaries with a symmetrical pore structure and pores of 0.2 m and an effective filter surface of 0.2 sq m. The internal diameter of the polypropylene capillaries was 1.8 mm.

Polypropylene is absolutely neutral vis-a-vis wine. As a hydrophobic polymer it had to be hydrophilized prior to use.

The filtration processes were carried out with and without backflushing.

The effect of backflushing was not detectable at low temperature (17° C.) and low flow velocity (1 m/sec).

It was still relatively slight at low temperature (17° C.) and high flow velocity (4 m/sec).

The effect of backflushing was not marked at elevated temperature (35° C.) and low flow velocity (1 m/sec).

However, the effect of backflushing was very clear-cut at levated temperature (35° C.) and high flow velocity (4 m/sec).

The backflushing interval was five minutes and the duration of backflushing was four seconds.

The mean trans-membrane pressures were as follows at the following flow velocities:
flow velocity of 1 m/sec: 0.4 bar
flow velocity of 2 m/sec: 0.6 bar
flow velocity of 3 m/sec: 0.8 bar.

The results obtained have been represented graphically in FIGS. 2a, 2b; 3a, 3b and 4.

EXAMPLE 2

In a long-term test, after the first tapping, 10,000 l of a newly fermented white wine with a content of substances producing turbidity of 0.03–0.04% (abs. dry) was filtered to a residual quantity of 20 l, i.e. 0.2% of the initial quantity, in a microfiltration set-up with a membrane surface of 4 sq m at a temperature of 25° C. and a flow velocity of 1.5 m/sec without backflushing. The filtration yield remained constant under these conditions until the end of the experiment. The mean trans-membrane pressure was 0.8 bar. The pore diameter of the membrane was 0.2 m.

EXAMPLE 3

Figure 5A:
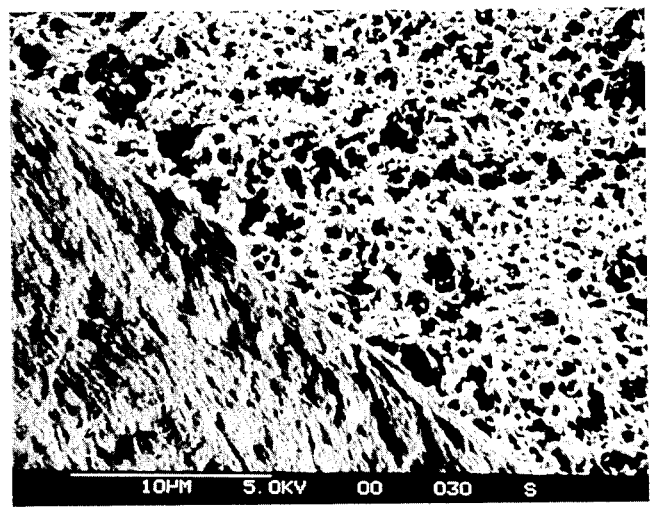
FIGS. 5a and b illustrate the results of Example 3.

After crossflow-microfiltration of red wine at 22° C., pictures were taken of the ensuing colloidal coating layer with a raster electron microscopic apparatus. Although these experiments without backflushing were carried out with a relatively low flow velocity (1 m/sec), which favors formation of the coating layer, the filtration-inhibiting coating layer that was formed had a maximum thickness of only 0.5 m. As shown in FIG. 5a, it occurred only on the filter surface.

Figure 5B:
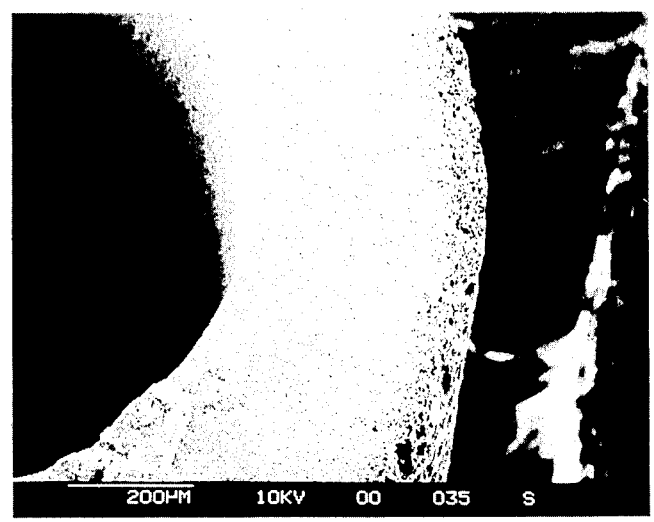
FIG. 5b shows an equivalent REM picture of a capillary membrane section; enlargement 1:1000.
Figure 4:
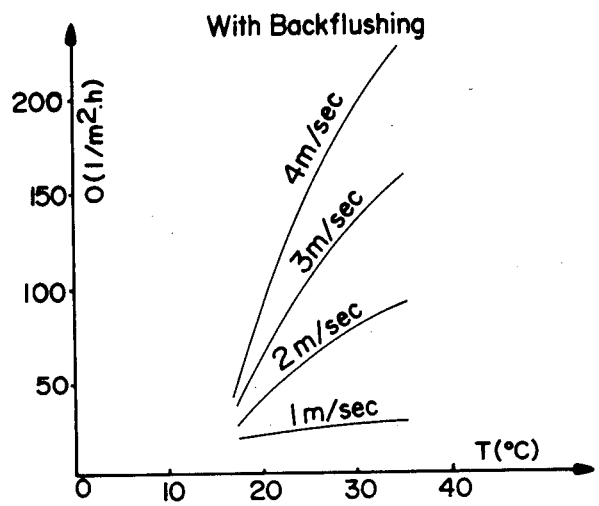
Figure 6:
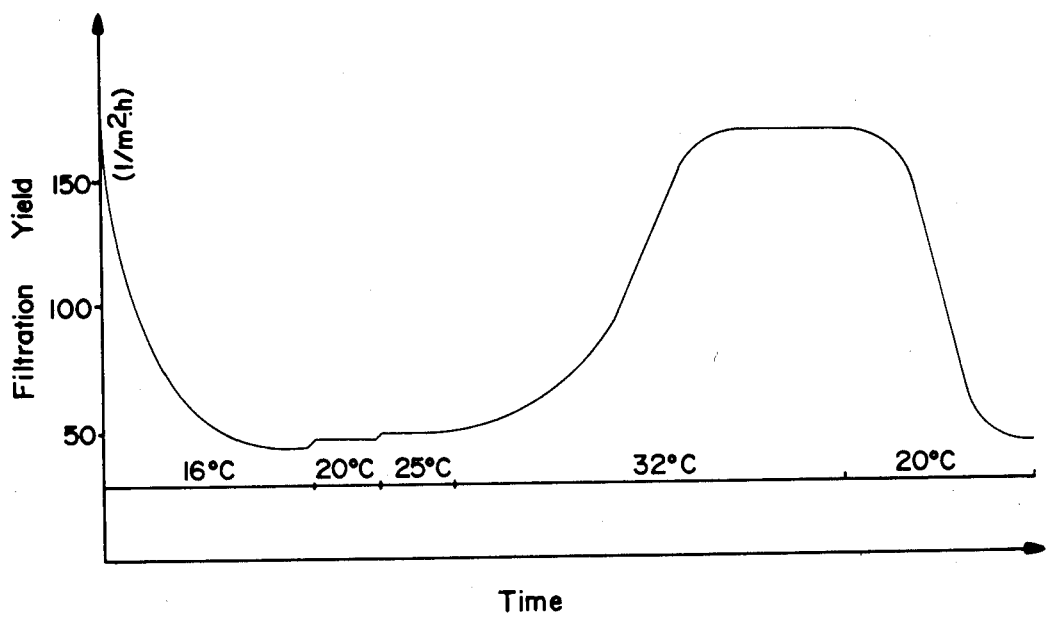
FIG. 6 illustrates the filtration yield of a 1982 white wine as dependent on the time.

There was no coating of the pores between the nonfiltrate and filtrate side even though, with the exception of the external edge, pore structure is very symmetrical as noted in FIG. 5b.

What is claimed is:

1. A process for the crossflow-microfiltration of wine from a storage container, comprising conveying said wine to an internal circuit from which a filtrate is removed by a membrane filter with membranes having a nominal pore diameter of 0.1–5 $\mu$m, in which the mean velocity in the membrane filter is 0.5–6 m/sec, wherein before entering the membrane filter the wine is warmed to a temperature higher than a temperature threshold that produces a definite increase in filter performance up to 45° C., said filtrate obtained is cooled to storage temperature and a partial stream of concentrate in which solids causing turbidity have accumulated is conveyed to an external circuit, said process being carried out without addition of filtering aids.

2. Process according to claim 1, wherein said temperature is 30°–40° C.

3. Process according to claim 1, wherein a filtrate obtained in said process is backflushed.

4. Process according to claim 1, wherein said solids of the concentrate are separated in a mechanical separator in said external circuit and a liquid component of the concentrate is returned to the internal circuit.

5. Process according to claim 1, wherein said concentrate is cooled in a heat exchanger in the external circuit with wine from a storage container which is to be warmed for filtration, and said concentrate is thereafter returned to the storage container.

6. Process according to claim 1, wherein the temperature of the internal circuit is different from the temperature of the external circuit.

7. Process according to claim 6, wherein warming of the wine to said temperature above the temperature threshold is effected immediately prior to its entering the internal circuit and product streams leaving the internal circuit are immediately cooled.

8. Process according to claim 1, the said warming of the wine is achieved as much as possible by heat exchange between wine entering said membrane filter and products leaving said membrane filter.

9. Apparatus for crossflow-microfiltration of wine, comprising a storage container, a membrane filter with a nominal pore diameter of 0.1–5 μm, a feed pump and piping, a heating device attached upstream of the membrane filter, and a cooling device and filtrate container attached downstream of the membrane filter, wherein the heating device and cooling device each have three pipe systems and the cooling device is filled with a heat-transferring medium, whereby the first pipe system of the heating device is provided with a heating medium, the second pipe system of the heating device is coupled with the inlet of the membrane filter and the second pipe system of the cooling device, the third pipe system of the heating device is coupled with the filtrate of the membrane filter and the third pipe system of the cooling device, the first pipe system of the cooling device is provided with a coolant, and the second pipe system of the cooling device is coupled with the storage container and the third pipe system is coupled with the filtrate container.

10. Apparatus according to claim 9 wherein the heating device and the cooling device are combined in one joint construction unit.

11. Apparatus according to claim 9 wherein the membrane filter comprises several linked membrane filter modules.

12. Apparatus according to claim 9, wherein some of said filter modules are coupled consecutively and some are coupled in parallel.

* * * * *

UNITED STATES PATENT AND TRADEMARK OFFICE
CERTIFICATE OF CORRECTION

PATENT NO. : 4,724,080

DATED : February 9, 1988

INVENTOR(S) : Heribert DAU et al

It is certified that error appears in the above-identified patent and that said Letters Patent is hereby corrected as shown below:

On the cover page, in the ABSTRACT, line 4, change "m," to -- $\mu$m,--;

On the cover page, in the ABSTRACT, line 14, change "m," to -- $\mu$ m,--.

Column 1, line 53, change "clarifiction" to --clarification--.

Column 2, line 66, change "Labensmittel-Rundschau" to --Lebensmittel-Rundschau--.

Column 3, line 37, after "aids" insert --and--;

line 51, change "flush-" to --backflush---;

line 66, change "1:1000." to --1:100.--.

Column 6, line 38, change "wire" to --wine--.

UNITED STATES PATENT AND TRADEMARK OFFICE
CERTIFICATE OF CORRECTION

PATENT NO. : 4,724,080

DATED : February 9, 1988

INVENTOR(S) : Heribert DAU et al

It is certified that error appears in the above-identified patent and that said Letters Patent is hereby corrected as shown below:

Column 7, line 42, change "m" to -- µm --;

line 58, change "levated" to --elevated--.

Column 8, line 13, change "m." to -- µm.--.

Signed and Sealed this

Twelfth Day of July, 1988

Attest:

DONALD J. QUIGG

Attesting Officer

Commissioner of Patents and Trademarks